United States Patent
Hu et al.

(10) Patent No.: US 7,409,085 B2
(45) Date of Patent: Aug. 5, 2008

(54) METHOD AND APPARATUS FOR DETERMINING SYMMETRY IN 2D AND 3D IMAGES

(75) Inventors: Qingmao Hu, Singapore (SG); Wieslaw Lucjan Nowinski, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 539 days.

(21) Appl. No.: 10/477,295

(22) PCT Filed: Jan. 18, 2002

(86) PCT No.: PCT/SG02/00006

§ 371 (c)(1),
(2), (4) Date: Jul. 15, 2004

(87) PCT Pub. No.: WO03/060827

PCT Pub. Date: Jul. 24, 2003

(65) Prior Publication Data

US 2004/0240753 A1    Dec. 2, 2004

(51) Int. Cl.
*G06K 9/00* (2006.01)
*G06K 9/32* (2006.01)
*G06K 9/36* (2006.01)

(52) U.S. Cl. .................. 382/171; 382/293

(58) Field of Classification Search ................ 382/115, 382/118, 128, 131–133, 154, 171–173, 175, 382/181, 195, 218, 219, 272, 284, 286, 293, 382/190

See application file for complete search history.

(56) References Cited

U.S. PATENT DOCUMENTS

| | | | |
|---|---|---|---|
| 5,613,013 A * | 3/1997 | Schuette | 382/124 |
| 5,680,481 A | 10/1997 | Prasad et al. | |
| 5,889,892 A | 3/1999 | Saito | |
| 6,701,173 B2 * | 3/2004 | Nowinski et al. | 600/407 |
| 7,013,037 B2 * | 3/2006 | Polkus et al. | 382/132 |
| 2004/0240753 A1 * | 12/2004 | Hu et al. | 382/286 |

FOREIGN PATENT DOCUMENTS

| | | |
|---|---|---|
| EP | 0889438 A2 | 7/1999 |
| JP | 09 035055 A | 7/1997 |
| JP | 11 332848 A | 7/1999 |

OTHER PUBLICATIONS

Notification Of Transmittal Of International Preliminary Report (Form PCT/IPEA/416) On Patentability mailed on Jun. 11, 2004, including PCT International Preliminary Examination Report (Form PCT/IPEA/409) for International Application No. PCT/SG 2002/000006, 7 pgs.

* cited by examiner

*Primary Examiner*—Amir Alavi
(74) *Attorney, Agent, or Firm*—Conley Rose, P.C.

(57) ABSTRACT

A method of determining symmetry in an image, a method of determining a symmetry plane line segment of a 3D image, a method of determining a symmetry line of a 2D image, and a computer program product. The method includes a) determining at least one searching line segment within a predefined search area of an image portion, the at least one searching line segment including a reference point (x, y) at its center and an angle θ with respect to a predetermined axis of the image portion; b) for each searching line segment, determining a first local characteristic in accordance with a measurement at points adjacent the searching line segment; c) determining the symmetry in the image in accordance with a calculation based on the first local characteristic.

22 Claims, 10 Drawing Sheets

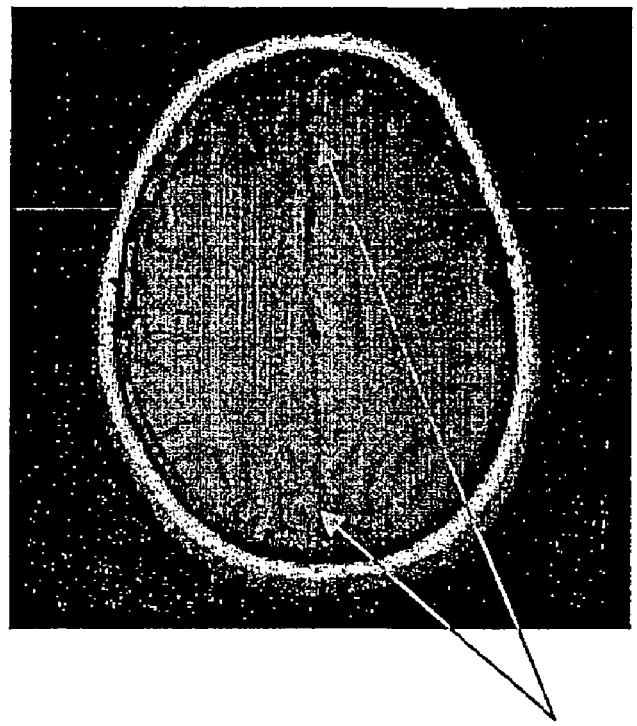
7(a): Fissure pattern of T1-weighted slice
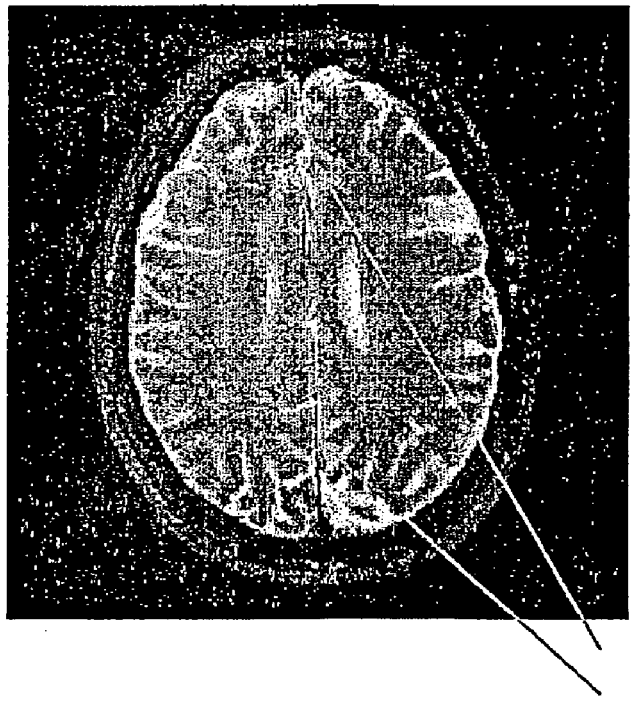
7(b): Fissure pattern of T2-weighted slice

METHOD AND APPARATUS FOR DETERMINING SYMMETRY IN 2D AND 3D IMAGES

This application is a 371 of PCT/SG02/00006 filed on Jan. 18, 2002.

FIELD OF THE INVENTION

The present invention relates to the processing of images. More particularly, the present invention relates to the processing of two-dimensional (2D) images or the processing of three-dimensional (3D) images, where such 3D images comprise a plurality of 2D image slices. In one aspect, the present invention is suitable for use in the determination of a plane of symmetry in a 3D medical image. For example, the present invention is suitable for use in determining the midsagittal plane (MSP) of the human brain from radiological images, and it will be convenient to hereinafter describe the invention in relation to that exemplary application. It should be appreciated, however, that the invention is not limited to that application, only.

BACKGROUND OF THE INVENTION

Human brains exhibit an approximate bilateral symmetry with respect to the inter-hemispheric (longitudinal) fissure bisecting the brain, known as the MSP. However, human brains are almost never perfectly symmetric (R. J. Davidson, K. Hugdahl, Eds., Brain Asymmetry. Cambridge, Mass.: MIT Press/Bradford Books, 1996). A characteristic of the longitudinal fissure is that it is filled with cerebro-spinal fluid (CSF), which is quite dark in T1-weighted magnetic resonance (MR) images and quite bright in T2-weighted MR images.

MSP detection is often the first step in spatial normalization or anatomical standardization of brain images (J. L. Lancaster, T. G. Glass, B. R. Lankipalli, H. Downs, H. Mayberg, P. T. Fox, 'A modality-independent approach to spatial normalization of tomographic images of the human brain,' Human Brain Mapping (1995), 3: 209-223). It is also a useful first step in intrasubject inter/intramodality image registration (I. Kapouleas, A. Alavi, W. M. Alves, R. E. Gur, 'Registration of three-dimensional MR and PET images of the human brain without markers,' Radiology (1991), 181:731-739). Determination or extraction of the MSP could provide a powerful tool to detect brain asymmetry due to tumors as well as any mass effects for diagnosis. In addition, extraction of the MSP is a prerequisite for automatically determining the anterior and posterior commissures needed by the Talairach framework. The Talairach framework is a particular methodology that would be recognized by the person skilled in the art.

Due to the great importance of the MSP, its determination and extraction has attracted quite a lot of research work. One paper entitled 'Robust midsagittal plane extraction from normal and pathological 3D neuroradiology images' IEEE Transactions on Medical Imaging (2001), 20(3): 175~192, by Y. Liu, R. T. Collins, W. E. Rothfus presented a cross-correlation algorithm to locate the plane that maximised bilateral symmetry. The algorithm first pre-processed the original 3D images to get edge maps. Then it calculated cross-correlation between axial slices and their reflection around an axis in the edge map to estimate the orientation that maximised the symmetry. From the estimated orientations of all the axial slices the orientation of the MSP was approximated. One of the limitations of the algorithm is its dependence on the edge map, which is quite prone to noise and skull appearances. Furthermore, the algorithm is hardly applicable to clinical environments since it is too time consuming (as long as 7 minutes for a typical volume). The two papers by the same authors entitled 'Evaluation of a robust midsagittal plane extraction algorithm for coarse, pathology 3D images' Proceedings of Medical Image Computing and Computer Assisted Intervention (MICCAI 2000): 81-94, and 'Automatic bilateral symmetry (midsagittal) plane extraction from pathology 3D neuroradiological images' Proceeding of SPIE International Symposium on Medical Imaging (1998), vol. 3338: 1529-1539, respectively, have similar drawbacks.

The paper entitled 'Automatic detection of mid-sagittal plane in 3D brain images' IEEE Transactions on Medical Imaging (1997), 16(6): 947~952 by B. A. Ardekani, J. Kershaw, M. Braun, I. Kanno presented a method purely based on symmetry assumption via calculation of cross correlation of grey level distribution around a plane, and took the plane with maximum cross-correlation as the approximated MSP. The algorithm was very sensitive to asymmetry in the 3D images, and could not deal with pathological images. The paper entitled 'Fully automatic identification of AC and PC landmarks on brain MRI using scene analysis' IEEE Transactions on Medical Imaging (1997), 16(5): 610~616 by L. Verard, P. Allain, J. M. Travere, J. C. Baron, D. Bloyet presented a method to extract the MSP via detecting fissure lines in each axial slice. The algorithm failed in those axial slices where the lateral ventricle was present. The algorithm also failed if any of the fissure lines were not straight or too broad, as in the case of excessive CSF.

The paper entitled 'Hough transform detection of the longitudinal fissure in tomographic head images' IEEE Transactions on Medical Imaging (1991), 10(1):74~81 by M. E. Brummer presented a method to extract the MSP via Hough transform (HT) for plane detection. The algorithm needed pre-processing to get appropriate gradient modulus that should be fissure line dominant, which was difficult if not impossible due to noise, skull and skin appearances. The calculation was intensive for HT transformation in all slices. In addition, an incorrect detection of a fissure line in one slice would contribute to the final extraction, because there was no way to correct automatically. If the subjects being imaged were pathological such as containing excessive amount of CSF or having tumors, the algorithm also failed.

Whilst the first method noted above by Liu et. al may deal with both normal and pathological images, none of the suggested algorithms are suitable for clinical application either due to excessively time intensive computing or due to an inability to process the real clinical data with pathology or ubiquitous asymmetry presented in axial slices.

Essentially existing methods either try to extract the MSP via strict symmetry assumption without considering the grey level features of the fissure, or try to extract the MSP via fissure line detection based on low-level image processing techniques without considering the gross symmetry property of the fissure. None of the existing methods meet the current clinical requirements in terms of speed, accuracy, and robustness to clinical data. There is also a need to meet real time requirements for image processing in so far as determining the symmetry in an image.

OBJECT OF THE INVENTION

It is therefore an object of the present invention to provide a determination of symmetry in an image, which overcomes or ameliorates at least one of the problems of the prior art.

It is also an object of this invention to provide a clinically applicable solution to automatically determine the MSP of 3D radiological images. Ideally the solution should be specially tailored in terms of reasonably acceptable time for processing for a common hardware setup, robustness to variations in clinical data, user-friendliness, being fully automatic and stable.

SUMMARY OF THE INVENTION

With the above objects in mind, the present invention provides in one aspect a method of determining symmetry in an image, the method including the steps of: a) determine at least one searching line segment within a predefined search area of an image portion, the at least one searching line segment including a reference point (x, y) at its centre and an angle θ with respect to a predetermined axis of the image portion; b) for each searching line segment, determine a first local characteristic in accordance with a measurement at points adjacent the searching line segment; c) determine the symmetry in the image in accordance with a calculation based on the first local characteristic.

In essence the present invention stems from the realization that a localized characteristic measurement of a line segment in an image at points adjacent the line segment provides information at relatively low cost that can contribute to a relatively accurate determination of the symmetry of the entire image. A further realization of the present invention applies this localized characteristic measurement with histogram analysis to reject image anomalies that detract from a relatively accurate determination of the symmetry in an iterative manner that omits these anomalies from further processing, which would otherwise provide relatively low efficiency in image determination and analysis. In preferred embodiments, a further realization of the present invention combines the localized characteristic measurement with a further localised characteristic measurement of points along a given line segment in an image which is particularly useful in 3D image determination and processing.

In one preferred form of the invention, the first local characteristic is a local symmetry index $lsi(x,y,\theta)$ determined according to: d) for at least one pixel on said searching line segment, determining the sum of grey level differences for N pixel pairs located each side of said at least one pixel, said pixel pairs located on a line perpendicular to said searching line segment and intersecting said at least one pixel; e) summing said grey level differences determined in step d) and dividing this sum by the length of said searching line segment.

In another preferred form of the invention, the first local characteristic is a modified local symmetry index $mlsi(x,y,\theta)$ determined according to: f) for at least one pixel on said searching line segment, locating a closest pixel having a grey level less than a value below which a pixel is unlikely to be an object pixel and located on a line perpendicular to said searching line segment and passing through said pixel, and measuring a reference distance between said closest pixel and said line segment; g) for at least one pixel on said searching line segment, determining the sum of grey level differences for N pixel pairs located each side of said pixel, said pixel pairs located on said line perpendicular to said line segment and intersecting said at least one pixel; h) summing said grey level differences determined in step g) and dividing this sum by the length of said searching line segment.

In another aspect the present invention provides a method of determining a symmetry plane line segment of a 3D image, the 3D image comprising a set of parallel 2D slices, the method including the steps of: a) determine a first subset of slices from the plurality of 2D slices in accordance with predetermined criteria; b) for each of the first subset of slices, determine at least one searching line segment within a predefined search area of the slice, the at least one searching line segment including a reference point (x, y) at its centre and an angle θ with respect to a predetermined axis of the slice; c) for each searching line segment, determine a first local characteristic in accordance with a measurement at points adjacent the searching line segment; d) for each searching line segment, determine a second local characteristic in accordance with a measurement at points along the searching line segment; e) determine the symmetry plane line segment in accordance with a calculation based on the first and second local characteristics.

In a further aspect the present invention provides a method of determining a symmetry line of a 2D image, the method including the steps of: a) determine at least one searching line segment within a predefined search area of a 2D image portion, the at least one searching line segment including a reference point (x, y) at its centre and an angle θ with respect to a predetermined axis of the 2D image portion; b) for each searching line segment, determine a first local characteristic in accordance with a measurement at points adjacent the searching line segment; c) determine the symmetry line in accordance with a calculation based on the first local characteristic.

In yet another aspect the present invention provides a method of calculating a symmetry plane in a 3D image, the 3D image comprising a plurality of parallel 2D slices, the method including the steps of: a) determine a first histogram of a first local characteristic of line segments within a predefined search area of selected slices, the first histogram including a peak first local characteristic; b) determine differences with respect to the peak first local characteristic for each first local characteristic; c) determine a first set of line segments having differences less than a first predetermined threshold; d) calculate an approximate symmetry plane in accordance with the first set of line segments; e) determine a second histogram of a second local characteristic of the first set of line segments, said second local characteristic being determined with reference to the approximate plane of symmetry, the second histogram including a peak second local characteristic; f) determine differences with respect to the peak second local characteristic for each second local characteristic; g) determine the end points of a second set of line segments having differences less than a second predetermined threshold; h) calculate the symmetry plane based on said end points of the second set of line segments.

In another aspect the present invention provides a computer program product including:

a computer usable medium having computer readable program code and computer readable system code embodied on said medium for determining symmetry in an image, said computer program product further including:

computer readable code within said computer usable medium for:

a) determining at least one searching line segment within a predefined search area of an image portion, the at least one searching line segment including a reference point (x, y) at its centre and an angle θ with respect to a predetermined axis of the image portion;

b) for each searching line segment, determining a first local characteristic in accordance with a measurement at points adjacent the searching line segment;

c) determining the symmetry in the image in accordance with a calculation based on the first local characteristic.

In a further aspect the present invention provides a computer program product including:

a computer usable medium having computer readable program code and computer readable system code embodied on said medium for determining a symmetry plane line segment of a 3D image, the 3D image comprising a set of parallel 2D slices, said computer program product further including:

computer readable code within said computer usable medium for:

a) determining a first subset of slices from the plurality of parallel 2D slices in accordance with predetermined criteria;

b) for each of the first subset of slices, determining at least one searching line segment within a predefined search area of the slice, the at least one searching line segment including a reference point (x, y) at its centre and an angle θ with respect to a predetermined axis of the slice;

c) for each searching line segment, determining a first local characteristic in accordance with a measurement at points adjacent the searching line segment;

d) for each searching line segment, determining a second local characteristic in accordance with a measurement at points along the searching line segment;

e) determining the plane line segment in accordance with a calculation based on the first and second local characteristics.

In yet another aspect the present invention provides a computer program product including:

a computer usable medium having computer readable program code and computer readable system code embodied on said medium for determining a symmetry line segment of a 2D image, said computer program product further including:

computer readable code within said computer usable medium for:

a) determining at least one searching line segment within a predefined search area of the 2D image, the at least one searching line segment including a reference point (x, y) at its centre and an angle θ with respect to a predetermined axis of the slice;

for each searching line segment, determining a first local characteristic in accordance with a measurement at points adjacent the searching line segment;

c) determining the symmetry line segment in accordance with a calculation based on the first local characteristic.

In another aspect the present invention provides a computer program product including:

a computer usable medium having computer readable program code and computer readable system code embodied on said medium for calculating a symmetry plane in a 3D image, the 3D image comprising a plurality of parallel 2D slices, said computer program product further including:

computer readable code within said computer usable medium for:

a) determining a first histogram of a first local characteristic of line segments within a predefined search area of selected slices, the first histogram including a peak first local characteristic;

b) determining differences with respect to the peak first local characteristic for each first local characteristic;

c) determining a first set of line segments having differences less than a first predetermined threshold;

d) calculating an approximate symmetry plane in accordance with the first set of line segments;

e) determining a second histogram of a second local characteristic of the first set of line segments, said second local characteristic being determined with reference to the approximate plane of symmetry, the second histogram including a peak second local characteristic;

f) determining differences with respect to the peak second local characteristic for each second local characteristic;

g) determining the end points of a second set of line segments having differences less than a second predetermined threshold;

h) calculating the symmetry plane based on said end points of the second set of line segments.

In another aspect the present invention provides a method of extracting MSP from radiological images including the steps of: determining axial slices to be processed from the radiological images; analysing the axial slices to determine fissure line segments; and calculating plane equation of MSP from the fissure line segments.

The radiological images of the brain may be from different modalities (e.g. CT, MR, PET, SPET etc.,) or pulse sequences (e.g., T1-weighted, T2-weighted, flair, or proton density weighted), arbitrary scanning orientations (axial, coronal, or sagittal), normal or abnormal brains.

In the preferred embodiment, the fissure line segments may be determined by optimization of local symmetry index and fissure pattern measure. Further, histogram analysis may be used to calculate the plane equation.

According to a further aspect, the present invention provides a computer program product including a computer usable medium having computer readable program code and computer readable system code embodied on said medium for extracting MSP from 3D radiological images within a data processing system, said computer program product further including computer readable code within said computer usable medium for: determining axial slices to be further processed for fissure line segments; extracting fissure line segments in axial slices by optimisation of local symmetry index and fissure pattern measure; and calculating plane equation of MSP from the extracted fissure line segments via histogram analysis.

In yet a further aspect, the present invention provides a method of calculating a plane equation from a plurality of non-intersecting line segments including the following steps:

(a) calculating a first histogram of line angles of each line segment and finding a peak angle of the first histogram;

(b) calculating angle differences between the peak angle and the line angles of each line segment and removing those line segments with the angle difference larger than a predetermined angle threshold;

(c) approximating the plane equation from remaining line segments;

(d) calculating distances of end points of the remaining line segments to the approximated plane and calculating a second histogram of distance distribution;

(e) finding a peak distance of the second histogram;

(f) calculating distance differences between the peak distance and the calculated distances, and removing those end points of the remaining line segments with the distance difference larger than a predetermined distance threshold;

(g) calculating the plane equation based on the remaining end points of the remaining line segments.

In still a further aspect, the present invention provides a method of determining a symmetry line segment in either a horizontal or vertical direction in a radiation image including the steps of:

(a) determining a searching region within the radiation image;

(b) calculating an approximate symmetry line segment;

(c) determining a refined searching region;

(d) calculating the symmetry line segment.

Embodiments of the present invention are made possible using the novel concepts of local symmetry index, fissure pattern measure, and a novel way to calculate plane equation based on histogram analysis. The present invention makes use of the geometric property (approximate symmetry measured by local symmetry index) and may also make use of grey level (fissure pattern measure) properties of fissure line segments on axial slices for accurate and fast determination of fissure line segments. The robust approximation method to calculate the plane equation of MSP from extracted fissure line segments via histogram analysis allows the present invention to deal with pathological images correctly where either tumor(s) or mass effects dominate some of the axial slices, since the extracted fissure line segments in these abnormal slices will be regarded as outliers and are excluded from plane equation determination of MSP.

According to another aspect, the present invention provides a method of extracting symmetry line from radiation images via maximizing the modified local symmetry index.

According to yet a further aspect, the present invention provides a computer program product including a computer usable medium having computer readable program code and computer readable system code embodied on said medium for extracting symmetry line from radiation images within a data processing system, said computer program product further including computer readable code within said computer usable medium for extracting symmetry line from radiation images via maximising the modified local symmetry index.

BRIEF DESCRIPTION OF THE DRAWINGS

The invention may best be understood by reference to the following description in conjunction with the accompanying drawings, in which:

FIGS. 7(*a*) and 7(*b*) show the fissure lines in a T1-weighted MR slice and a T2-weighted MR slice.

DESCRIPTION OF PREFERRED EMBODIMENT

Head Coordinate System

Figure 1:
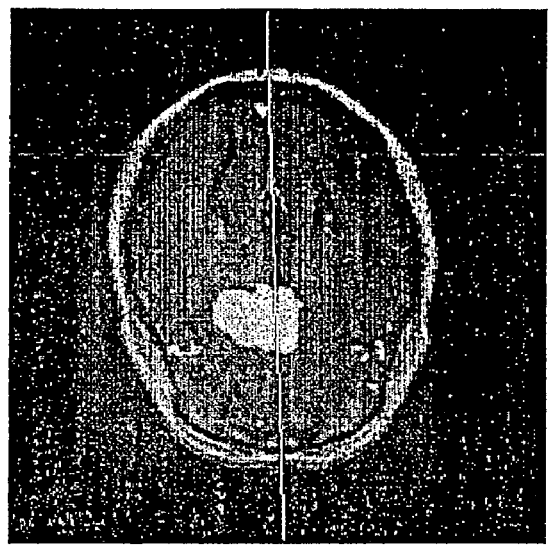
FIG. 1 shows a T1-weighted MR slice with tumor, superimposed with the detected fissure line.
Figure 2:
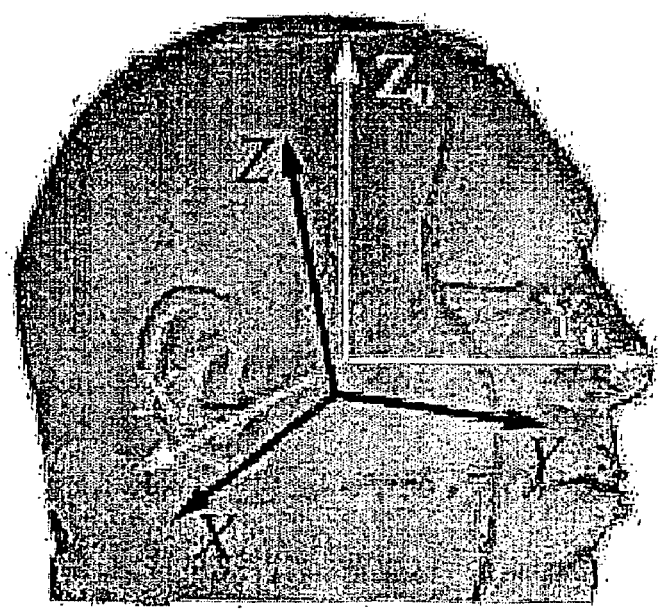
FIG. 2 shows the ideal head coordinate system $X_0Y_0Z_0$ and the real imaging coordinate system XYZ.

Referring to FIG. 2, the ideal head coordinate system is centered in the brain with positive $X_0, Y_0, Z_0$ axes pointing to the right, anterior, and superior directions, respectively. In clinical practice, the imaging coordinate system XYZ (FIG. 2, black coordinate axis) differs from the ideal coordinate system due to positioning offsets (translations) and rotation of the head when imaged. With respect to this coordinate system, the plane equation $X_0=0$ is the MSP of the brain, and it is an objective of this invention to find the plane equation of MSP in the XYZ coordinate system.

3D Images and Axial Slices

Neuroradiology scans are 3D volumetric data expressed as a stack of 2D slices.

The 3D images can be obtained in 3 different ways: slices that are scanned along X, Y, and Z directions are called sagittal, coronal, and axial scans respectively. The scanned 3D images are linearly interpolated in space so that the voxel sizes are $1\times 1\times 1$ mm$^3$. Since from sagittal and coronal scans axial slices can be obtained, all the scans may be represented by axial slices. From here onwards, 3D images are isotropic in X, Y, and Z axes, with a voxel size being $1\times 1\times 1$ mm$^3$. The stack of 2D axial slices as a whole is also called a 3D volume. The 3D volume to be processed is denoted as Vol(x, y, z) with x, y, and z being the coordinates at voxel (x,y,z). Here x, y, and z are all non-negative integers satisfying $0\leq x<XSize$
$0\leq y<YSize$
$0\leq z\leq ZSize$ With these denotations, the number of axial slices is ZSize. Axial slices are counted from 0 to ZSize−1. The ith ($0\leq i<ZSize$) axial slice is denoted as $S_i$ ($S_0, S_1, \ldots, S_{Zsize-1}$), and it is the intersection of Vol(x,y,z) with the plane z=i.

The grey level at a voxel (x,y,z) is denoted as g(x,y,z). In case of a radiation image, the grey level at pixel (x,y) is denoted as g(x,y). The two axes of an axial slice or a radiation image are denoted as H (horizontal) and V (vertical).

Extracting MSP from Axial Slices

One embodiment of the present invention will now be described in relation to extracting MSP from 3D MR images.

For each axial slice $S_i$, its intersection with MSP is a line that is physically called a fissure line. Since different axial slices are parallel, so the fissure lines are parallel as well. A fissure line segment is a line segment with two end points on the fissure line.

Figure 3:
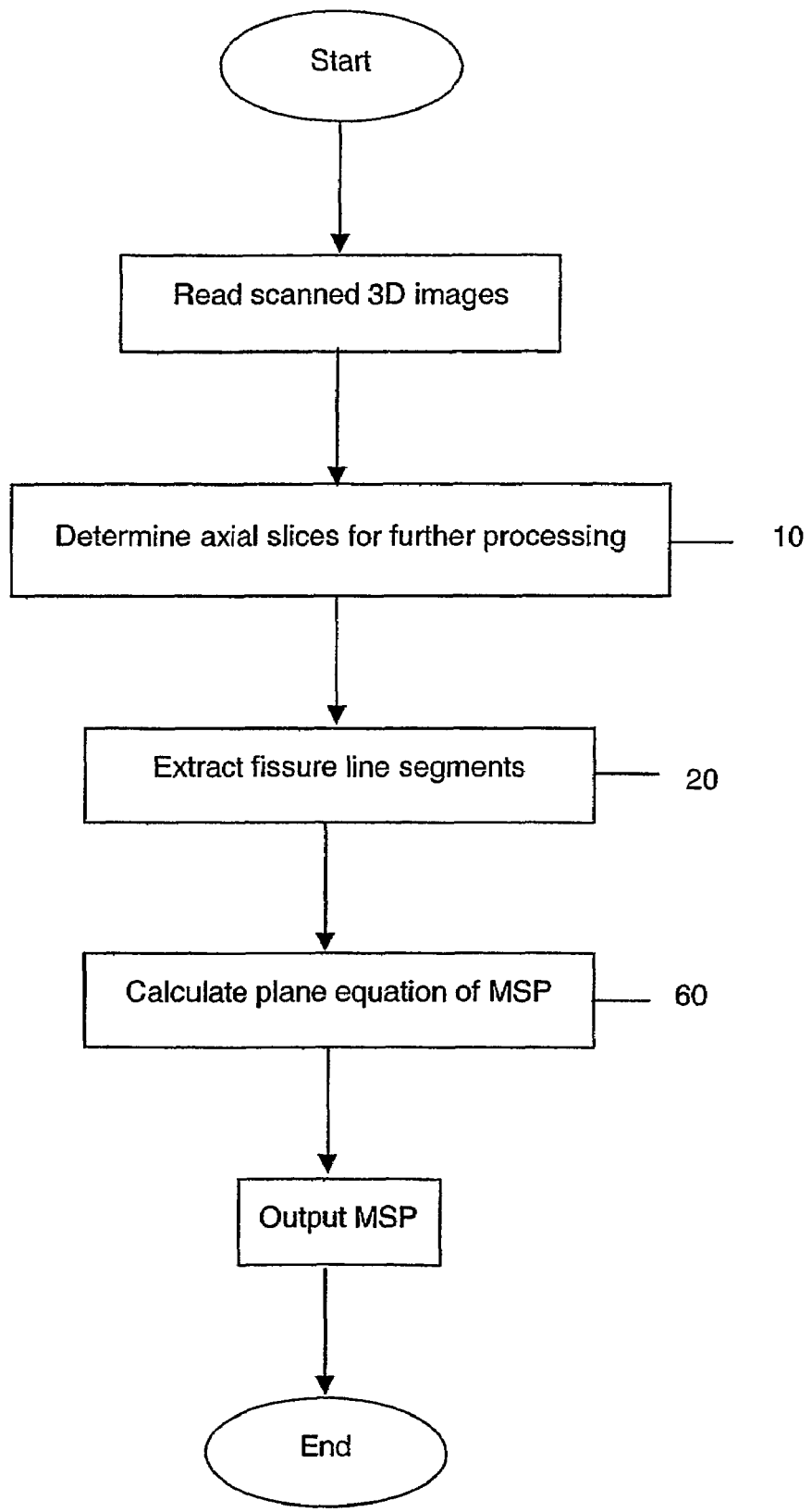
FIG. 3 is a flow chart illustrating the steps for extracting MSP from 3D radiological images according to an embodiment of the present invention.

Referring now to FIG. 3, a method for extracting MSP once a scanned 3D image has been read includes the following steps:

1. determining axial slices to be further processed for fissure line segments (10);
2. approximating fissure line segments in axial slices by optimisation of local symmetry index and fissure pattern measure (20); and
3. calculating the plane equation of MSP from the extracted fissure line segments via histogram analysis (60).

The above-described steps which can provide MSP as an output will be described in greater detail herewith.

Determining the Axial Slices to be Processed

Figure 4:
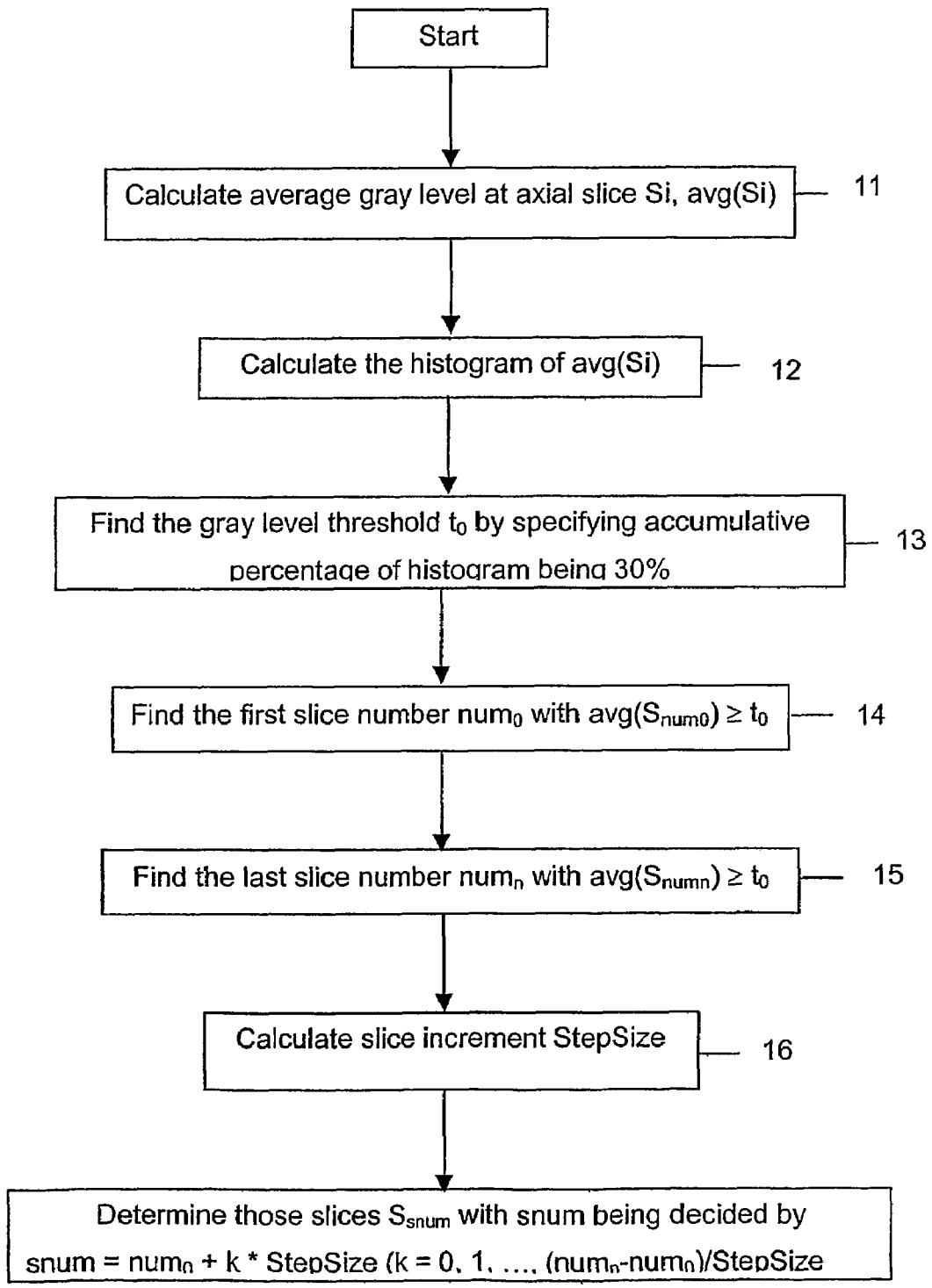
FIG. 4 is a flow chart illustrating the steps for determining the axial slices to be processed further within given 3D radiological images according to an embodiment of the present invention.

Now referring to FIG. 4 for determining the axial slices to be processed further within a given 3D MR volume Vol(x, y, z). It is noted that some of the clinical data sets may have some slices vacant in the beginning or/and ending parts of the volume, which should be removed from further processing. Instead of having slices stretching from 0 to ZSize−1, the first and last slices are determined by analysis of the histogram of the average grey levels (excluding starting/ending slices that have an average grey level smaller than a threshold described below). For each slice $S_i$ the system calculates the average grey level avg($S_i$) (11), then calculates the histogram of the average grey levels of all the axial slices (12). Once the histogram has been determined the system counts the accumulative percentage of the histogram from average grey level 0 to a threshold $t_0$, so that the accumulative percentage is equal to or above 30% (13). From axial slice 0 to slice ZSize-1, the system finds the first slice with an average grey level equal to or bigger than the threshold $t_0$ and denotes the slice number as $num_0$ (14). Similarly, the system finds the last slice with an average grey level equal to or larger than the threshold $t_0$ and denotes the slice number as $num_n$ (15). From the beginning and ending slice numbers $num_0$ and $num_n$, the slice increment is calculated to ensure the number of slices to be processed is smaller than 20 (16) as less than 20 slices has been found to provide a system which is not too time consuming but still maintains accuracy. The slice increment, which is denoted as StepSize, may be calculated as follows:

$L = num_n - num_0$
If (L>30) StepSize=L/15
Else if (L>20) StepSize=L/10
Else if (L>15) StepSize=L8
Else StepSize=1.

So the axial slices to be processed further will have the slice number snum calculated as follow:

$$snum = num_0 + k*StepSize \ (k=0, 1, \ldots, L/StepSize)$$

i.e., only $S_{snum}$ will be processed further herewith.

Process Axial Slices to Get the Fissure Line Segments

For the axial slice $S_{snum}$ to be processed further, its center of gravity $(x_c(S_{snum}), y_c(S_{snum}))$ is calculated as follow:

$$x_c(S_{snum}) = \sum_x \sum_y x^* g(x, y, snum) \Big/ \sum_x \sum_y g(x, y, snum)$$

$$y_c(S_{snum}) = \sum_x \sum_y y^* g(x, y, snum) \Big/ \sum_x \sum_y g(x, y, snum)$$

Figure 5:
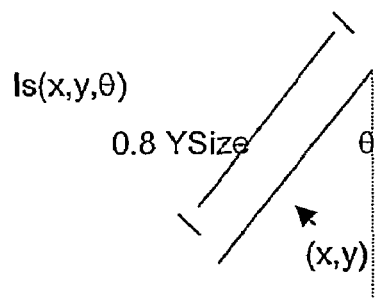
FIG. 5 illustrates the concept of searching line segment $ls(x,y,\theta)$.

From a pixel (x,y) in slice $S_{snum}$, several line segments can be drawn. The line segment taking (x,y) as its center, with the length of line segment being 0.8 YSize, and the angle with respect to the V axis being θ, is denoted as ls(x,y,θ) as shown in FIG. 5. ls(x,y,θ) is called the searching line segment of pixel (x,y) with a searching angle θ, and pixel (x,y) is called the searching point. Note here that the rational to choose the length of line segment as 0.8 YSize is that the fissure line normally has a roughly vertical orientation, and its extension is around 0.8 YSize, however the length of the line segment is not critical in the sense that a smaller length like 0.7 YSize can be used as well. All the searching points (x,y), together with the specified searching angle θ, satisfying the following conditions form the gross searching region:

−10 mm≦(x−$x_c(S_{snum})$)≦10 mm
y=$y_c(S_{snum})$
−10°≦θ≦10° where mm stands for millimeter.

Figure 6:
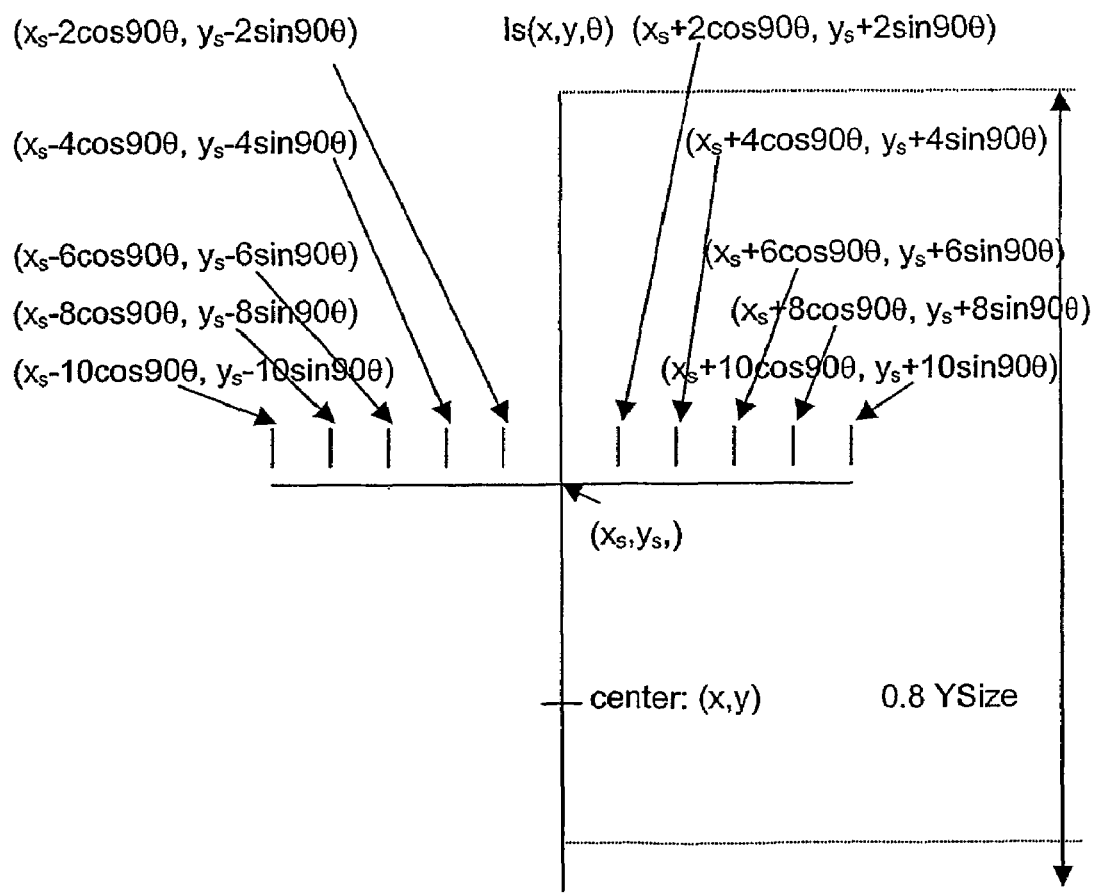
FIG. 6 illustrates a pixel $(x_s, y_s)$ on the searching line segment $ls(x,y,\theta)$, and its associated 5 pairs of points on the opposite sides of the searching line segment, for calculating the contribution of the pixel $(x_s, y_s)$ to local symmetry index.

For a searching line segment ls(x,y,θ), its local symmetry index lsi(x,y,θ) is a measure of grey level symmetry in its local vicinity. Specifically, for each pixel $(x_s, y_s)$ on the searching line segment, the system preferably checks 5 pairs of points at the opposite sides of ls(x,y,θ) that are on the line perpendicular to ls(x,y,θ) and passing (x,y) with a distance to ls(x,y,θ) 2, 4, 6, 8 and 10 mm respectively (as shown in FIG. 6). Denote cos (90°+θ) as cos 90θ, and sin (90°+θ) as sin 90θ. The contribution of the pixel $(x_s, y_s)$ to the local symmetry index lsi(x,y,θ) is fabs(g($x_s$+2 cos 90θ, $y_s$+2 sin 90θ, snum)−g($x_s$−2 cos 90θ, $y_s$−2 sin 90θ, snum))+fabs(g($x_s$+4 cos 90θ, $y_s$+4 sin 90θ, snum)−g($x_s$−4 cos 90θ, $y_s$−4 sin 90θ, snum))+fabs(g($x_s$+6 cos 90θ, $y_s$+6 sin 90θ, snum)−g($x_s$−6 cos 90θ, $y_s$−6 sin 90θ, snum))+fabs(g($x_s$+8 cos 90θ, $y_s$+8 sin 90θ, snum)−g($x_s$−8 cos 90θ, $y_s$−8 sin 90θ, snum))+fabs(g($x_s$+10 cos 90θ, $y_s$+10 sin 90θ, snum)−g($x_s$−10 cos 90θ, $y_s$−10 sin 90θ, snum))

where fabs(.) is the absolute value function. For all $(x_s, y_s)$ on the searching line segment ls(x,y,θ), the system calculates its contribution to lsi(x,y,θ), then sums them up and divides the sum by the length of ls(x,y,θ) to get the local symmetry index lsi(x,y,θ), i.e., the formula to calculate lsi(x,y,θ) is $$|ls(x, y, \theta)| lsi(x, y, \theta) = \sum_{(xs,ys)} fabs(g(x_s + 2\cos 90\theta, y_s + 2\sin 90\theta, snum) - g(x_s - 2\cos 90\theta, y_s - 2\sin 90\theta, snum)) +$$

$$\sum_{(xs,ys)} fabs(g(x_s + 4\cos 90\theta, y_s + 4\sin 90\theta, snum) - g(x_s - 4\cos 90\theta, y_s - 4\sin 90\theta, snum)) +$$

$$\sum_{(xs,ys)} fabs(g(x_s + 6\cos 90\theta, y_s + 6\sin 90\theta, snum) - g(x_s - 6\cos 90\theta, y_s - 6\sin 90\theta, snum)) +$$

$$\sum_{(xs,ys)} fabs(g(x_s + 8\cos 90\theta, y_s + 8\sin 90\theta, snum) - g(x_s - 8\cos 90\theta, y_s - 8\sin 90\theta, snum)) +$$

$$\sum_{(xs,ys)} fabs(g(x_s + 10\cos 90\theta, y_s + 10\sin 90\theta, snum) - g(x_s - 10\cos 90\theta, y_s - 10\sin 90\theta, snum))$$

where |ls (x,y,θ)| is the length of the searching line segment lsi(x,y,θ).

If the searching line segment is on the fissure line, then each pair of the 5 pairs of points should have similar grey levels, hence the local symmetry index should be small. This means the local symmetry index introduced in this invention captures the grey level symmetry property in the vicinity of the searching line segment. Since the local vicinity of the searching line is around the center (from the definition of searching area) and is quite far from the skull and skin, it is insensitive to any asymmetry due to skull and/or skin. It is important to note that the asymmetry due to skull and skin is very frequent in clinical radiological images. Any inadequate handling of skull and skin could cause some deviation of the approximated fissure line from its correct fissure line as skull and skin in T1-weighted MR slices will have bright grey level or strong edges and thus contribute to symmetry/asymmetry with a large weight if they are included in calculation for symmetry. None of the existing methods based on symmetry has excluded the influence of skin and skull. In addition, the implementation of local symmetry index is much faster in nature than the global symmetry index where all the pairs of points on the opposite sides of the searching line segment with an equal distance are compared.

Note that the local symmetry index does not consider the grey level feature of the fissure line itself. In fact, the fissure line also exhibits grey level features in normal slices. FIGS.

7(a) and 7(b) show the fissure lines in T1- and T2-weighted MR slices. In T1-weighted MR slices, the fissure line is characterized by its low grey level, with most of the pixels having a lower grey level than the average grey level of the fissure line. Similarly, in T2-weighted slices, the fissure line is characterized by its large grey level, with most of the pixels having a higher grey level than the average grey level of the fissure line. In both cases, the standard deviation of the grey level on the fissure line is small. To quantify this kind of fissure, fissure pattern measure is introduced by the present invention. For each searching line segment $ls(x,y,\theta)$, its fissure pattern measure is denoted as $fpm(x,y,\theta)$. Denote the average grey level of the searching line segment $ls(x,y,\theta)$ as $agl(x,y,\theta)$, the standard deviation of grey level as $sd(x,y,\theta)$, the number of pixels whose grey level is above the average as $npa(x,y,\theta)$, and the number of pixels whose grey level is below average as $npb(x,y,\theta)$, then the fissure pattern measure at the searching line segment $ls(x,y,\theta)$ is calculated by:

$$fpm(x,y,\theta)=0.5(255-agl(x,y,\theta))-sd(x,y,\theta)*0.8YSize/(3npb(x,y,\theta)) \text{ for T1-weighted slices, and}$$

$$fpm(x,y,\theta)=0.5agl(x,y,\theta)-sd(x,y,\theta)*0.8YSize/(3npa(x,y,\theta)) \text{ for T2-weighted slices.}$$

Here the point is, if the searching line segment is on or close to the fissure line, the average grey level should be low in T1-weighted MR slices and be high in T2-weighted MR slices, and the standard deviation of the grey level is low with most of the pixels being either above (T2-weighted) or below (T1-weighted) the average grey level. As a result, the fissure pattern measure $fpm(x,y,\theta)$ around the fissure line should be high.

Figure 8:
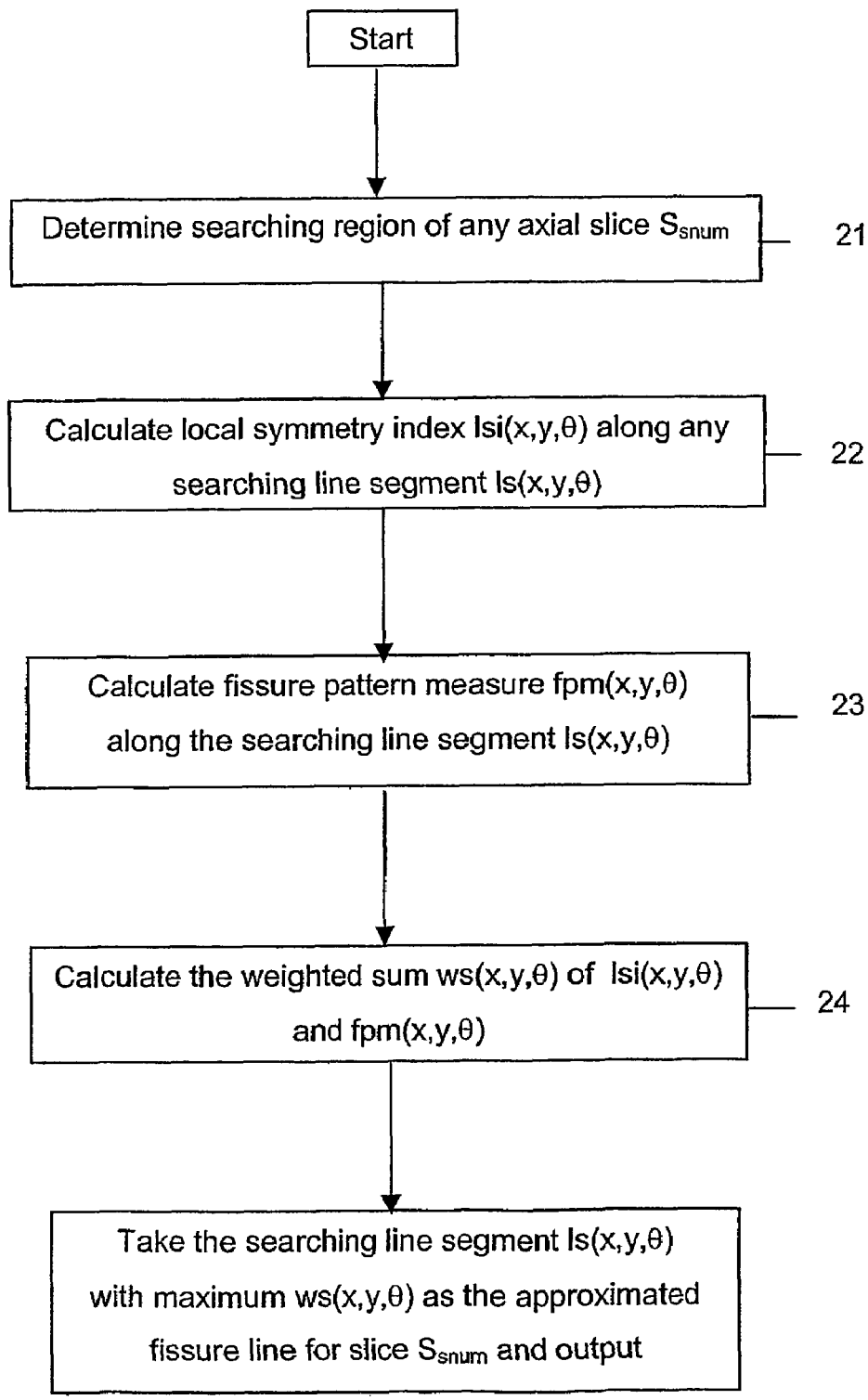
FIG. 8 illustrates the steps to locate the fissure line segment on an axial slice according to an embodiment of the present invention.

Referring to FIG. 8, the steps to locate the fissure line includes: determination of gross searching region (21); calculation of local symmetry index $lsi(x,y,\theta)$ for each searching line segment $ls(x,y,\theta)$ in the gross searching region (22); calculation of fissure pattern measure $fpm(x,y,\theta)$ (23); maximisation of the weighted sum of local symmetry index and fissure pattern measure to determine the approximated fissure line segment (24). Here the weighted sum of local symmetry index and fissure pattern measure is denoted as $ws(x,y,\theta)$, and is calculated by $$ws(x,y,\theta)=fpm(x,y,\theta)-w_{lsi}*lsi(x,y,\theta)$$

where $w_{lsi}$ is a positive constant which could be decided by discriminant analysis and may vary in the range of 5.0 to 20.0. From here onwards, it is fixed as 10.0 for the preferred system.

The searching line segment $ls(x,y,\theta)$ that maximises $ws(x,y,\theta)$ is taken as the approximated fissure line segment at slice $S_{snum}$. The searching in the gross searching area is preferably carried out with x increment 2 mm, and $\theta$ increment 2° in the first round to find the rough position of fissure line segment $ls(x_0,y_0,\theta_0)$. Then around the rough position of fissure line segment, the system defines the refined searching region such that for each $(x,y,\theta)$ in the refined searching region, they satisfy $-3.0 \text{ mm} \leq (x-x_0) \leq 3.0 \text{ mm}$ $y=y_0$ $-3.0° \leq (\theta-\theta_0) \leq 3.0°$ The search in the refined searching region is preferably done with x increment 0.5 mm, and $\theta$ increment 0.5°. The final extracted fissure line segment at slice $S_{snum}$ is denoted by its two end points $(x_b(snum), y_b(snum), snum)$, and $(x_\theta(snum), y_\theta(snum), snum)$ (where the first point is the beginning and the second point is the ending point of the line segment) and its angle with respect to V axis $\theta(S_{snum})$. Since the extraction of fissure line segments may be wrong, all the extracted fissure line segments are called approximated fissure line segments herewith.

Calculate the Plane Equation of MSP

Figure 9:
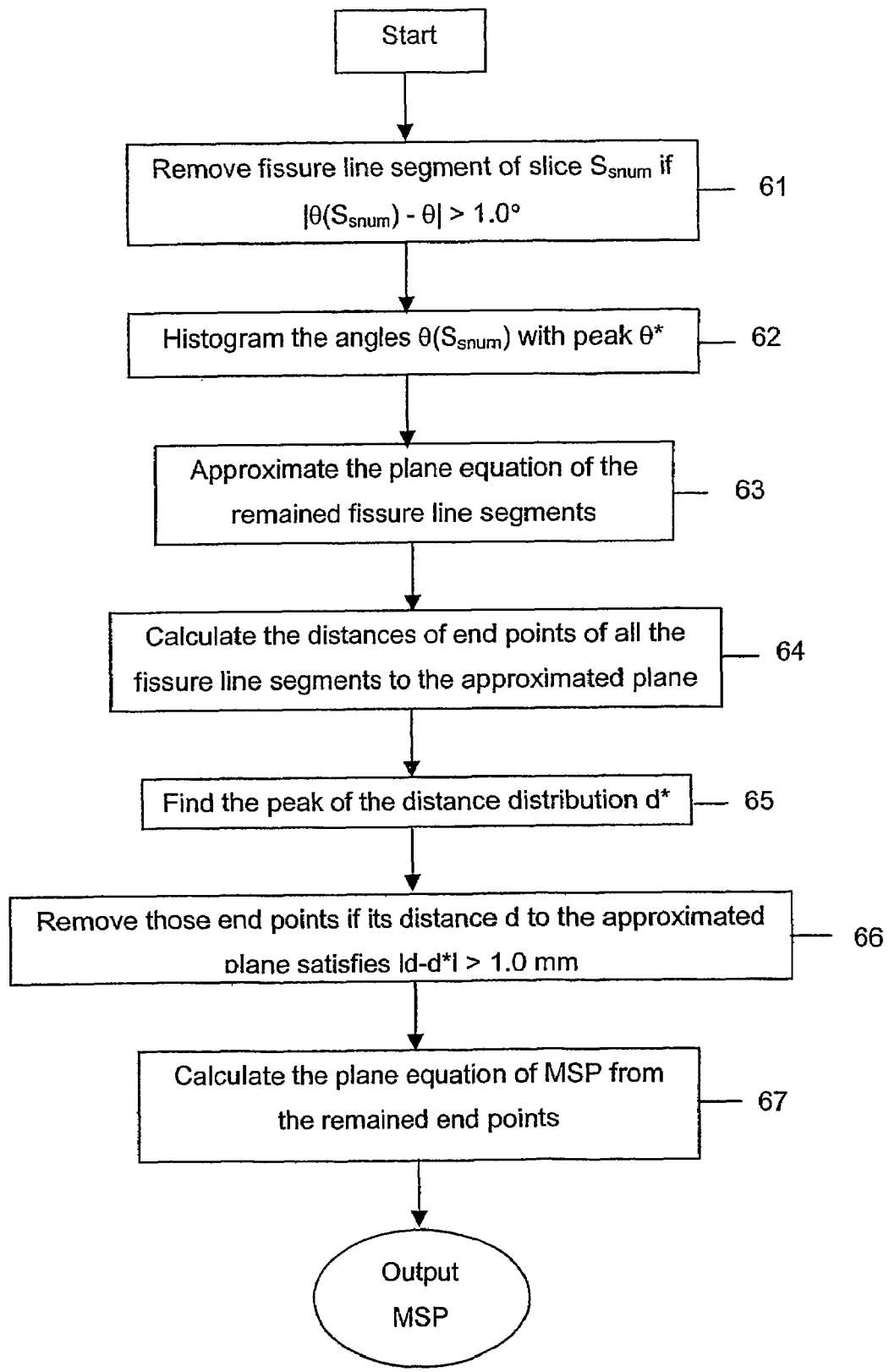
FIG. 9 illustrates the steps to calculate the plane equation of MSP according to an embodiment of the present invention.

Referring to FIG. 9, the calculation of the plane equation of MSP according to an embodiment is illustrated.

The first step is to histogram the angles $\theta(S_{snum})$ (61). Suppose the peak of the histogram is $\theta^*$.

The second step is to calculate the angle differences between $\theta(S_{snum})$ and $\theta^*$, and to remove those approximated fissure line segments that have an angle difference larger than 1.0° (62). The rational is, most of the approximated fissure line segments are correct and hence they should have very close orientation, while the approximated fissure lines in some of the abnormal slices will have a scattered orientation which should be excluded from calculation of plane equation of MSP. In this way, the outliers in orientation are removed.

Figure 10:
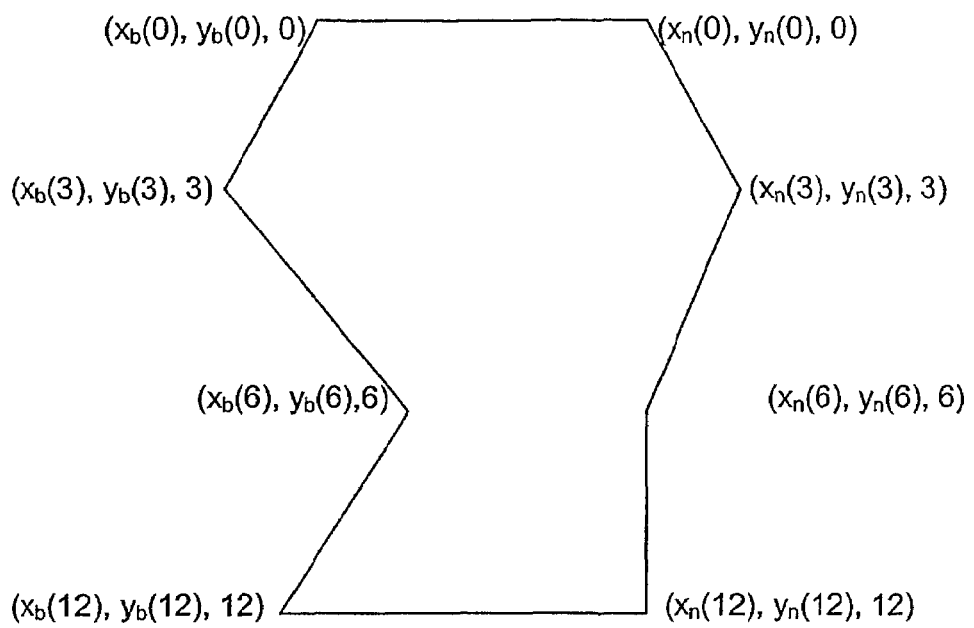
FIG. 10 illustrates how to form a closed polygon from all the remaining end points of fissure line segments.

The third step is to approximate the plane equation from the remaining approximated fissure line segments (63). From those remaining approximated fissure line segments, the system forms a closed polygon by connecting beginning points of neighboring slices, connecting ending points of neighboring slices, and connecting the approximated fissure line segments in the two slices with smallest and largest z coordinates, as illustrated by FIG. 10. The system may calculate the normal of the polygon by Newell's method (David Kirk, Graphics Gems III, p231-232, Academic Press, 1992). The approximated plane takes the calculated normal as the plane normal, and passes the average vector of all the remaining approximated fissure line segments.

The fourth step is to calculate the distances of all the end points of the remaining approximated fissure line segments to the approximated plane and to create a histogram of the distance distribution (64).

The fifth step is to find the peak of the histogram of the distance distribution (65). Denote the peak distance as $d^*$.

The sixth step is to calculate the distance differences between $d^*$ and all the calculated distances, and to remove those end points of the remaining approximated fissure line segments with a distance difference bigger than 1.0 mm (66). After the removal based on orientation and distance histogram analysis, the remaining end points of the approximated fissure line segments are supposed to be the right end points of fissure line segments.

The final step is to calculate the plane equation of MSP based on the remaining end points of the approximated fissure lines (67) by a similar method described in step 63: forming the closed polygon from remaining end points, approximating plane normal, and calculating the plane equation which takes the calculated normal as the plane normal and passes the average vector of all the vertexes of the polygon.

Figure 11:
FIG. 11 is an MSP calculated from a 3D T1-weighted MR volume using the method disclosed in the present invention.

A working illustration of this embodiment of the invention is provided in FIG. 11. It shows the MSP of a T1-weighted MR volume (256×256×168 voxels) extracted using the present embodiment of the invention. The correctness of the calculated MSP is assured via checking the extracted fissure line segments as well as via medical expert's knowledge of the expected MSP. The time taken for the extraction is 30 seconds on a SGI O2 system with mips 10000, 195 MHz CPU, and 190 MB RAM.

Extract Symmetry Line in a Radiation Image

The present invention can also be applied to extracting symmetry lines in radiation images. This is done via modified local symmetry index $mlsi(x,y,\theta)$.

Here the searching line segment ls(x,y,θ) will have a segment length of 0.8*XSize if the symmetry is approximately horizontal, or 0.8*YSize if the symmetry is approximately vertical.

For a searching line segment ls(x,y,θ), its modified local symmetry index is a measure of grey level symmetry in its local vicinity. Specifically, for each pixel $(x_s, y_s)$ on the searching line segment, the system looks for the closest pixel which is on the line perpendicular to ls(x,y,θ) and passing $(x_s, y_s)$ (perpendicular line) with a grey level smaller than a value below which a pixel is unlikely to be an object pixel which could be decided by histogram analysis. Denote the distance between the closest pixel and pixel $(x_s, y_s)$ as $d_0$. Check 5 pairs of points on the perpendicular line with a distance to ls(x,y,θ) $d_0+2$, $d_0+4$, $d_0+6$, $d_0+8$, and $d_0+10$ mm respectively. The contribution of the pixel $(x_s, y_s)$ to the modified local symmetry index mlsi(x,y,θ) is fabs(g($x_s$+($d_0$+2) cos 90θ, $y_s$+($d_0$+2) sin 90θ)−g($x_s$−($d_0$+2) cos 90θ, $y_s$−($d_0$+2) sin 90θ))+fabs(g($x_s$+($d_0$+4) cos 90θ, $y_s$+($d_0$+4) sin 90θ)−g($x_s$−($d_0$+4) cos 90θ, $y_s$−($d_0$+4) sin 90θ))+fabs(g($x_s$+($d_0$+6) cos 90θ, $y_s$+($d_0$+8) sin 90θ) g($x_s$−($d_0$6) cos 90θ, $y_s$−($d_0$6) sin 90θ))+fabs (g($x_s$+($d_0$8) cos 90θ, $y_s$+($d_0$+8) sin 90θ) −g($x_s$−($d_0$+8) cos 90θ, $y_s$−($d_0$+8) sin 90θ))+fabs (g($x_s$+($d_0$+10) cos 90θ, $y_s$+($d_0$+10) sin 90θ)−g($x_s$−($d_0$+10) cos 90θ, $y_s$−($d_0$10) sin 90θ))

For all $(x_s, y_s)$ on the searching line segment ls(x,y,θ), calculate its contribution to mlsi(x,y,θ), then sum them up and divide the sum by the length of ls(x,y,θ) to get the modified local symmetry index lsi(x,y,θ). i.e., the formula to calculate mlsi(x,y,θ) is $$|ls(x, y, \theta)|mlsi(x, y, \theta) = \sum_{(xs,ys)} fabs(g(x_s + (d_0 + 2)\cos 90\theta,$$
$$y_s + (d_0 + 2)\sin 90\theta) - g(x_s - (d_0 + 2)\cos 90\theta,$$
$$y_s - (d_0 + 2)\sin 90\theta)) +$$
$$\sum_{(xs,ys)} fabs(g(x_s + (d_0 + 4)\cos 90\theta,$$
$$y_s + (d_0 + 4)\sin 90\theta) - g(x_s - (d_0 + 4)\cos 90\theta,$$
$$y_s - (d_0 + 4)\sin 90\theta)) +$$
$$\sum_{(xs,ys)} fabs(g(x_s + (d_0 + 6)\cos 90\theta,$$
$$y_s + (d_0 + 6)\sin 90\theta) - g(x_s - (d_0 + 6)\cos 90\theta,$$
$$y_s - (d_0 + 6)\sin 90\theta)) +$$
$$\sum_{(xs,ys)} fabs(g(x_s + (d_0 + 8)\cos 90\theta,$$
$$y_s + (d_0 + 8)\sin 90\theta) - g(x_s - (d_0 + 8)\cos 90\theta,$$
$$y_s - (d_0 + 8)\sin 90\theta)) +$$
$$\sum_{(xs,ys)} fabs(g(x_s + (d_0 + 10)\cos 90\theta,$$
$$y_s + (d_0 + 10)\sin 90\theta) - g(x_s - (d_0 + 10)\cos 90\theta,$$
$$y_s - (d_0 + 10)\sin 90\theta))$$

Figure 12:
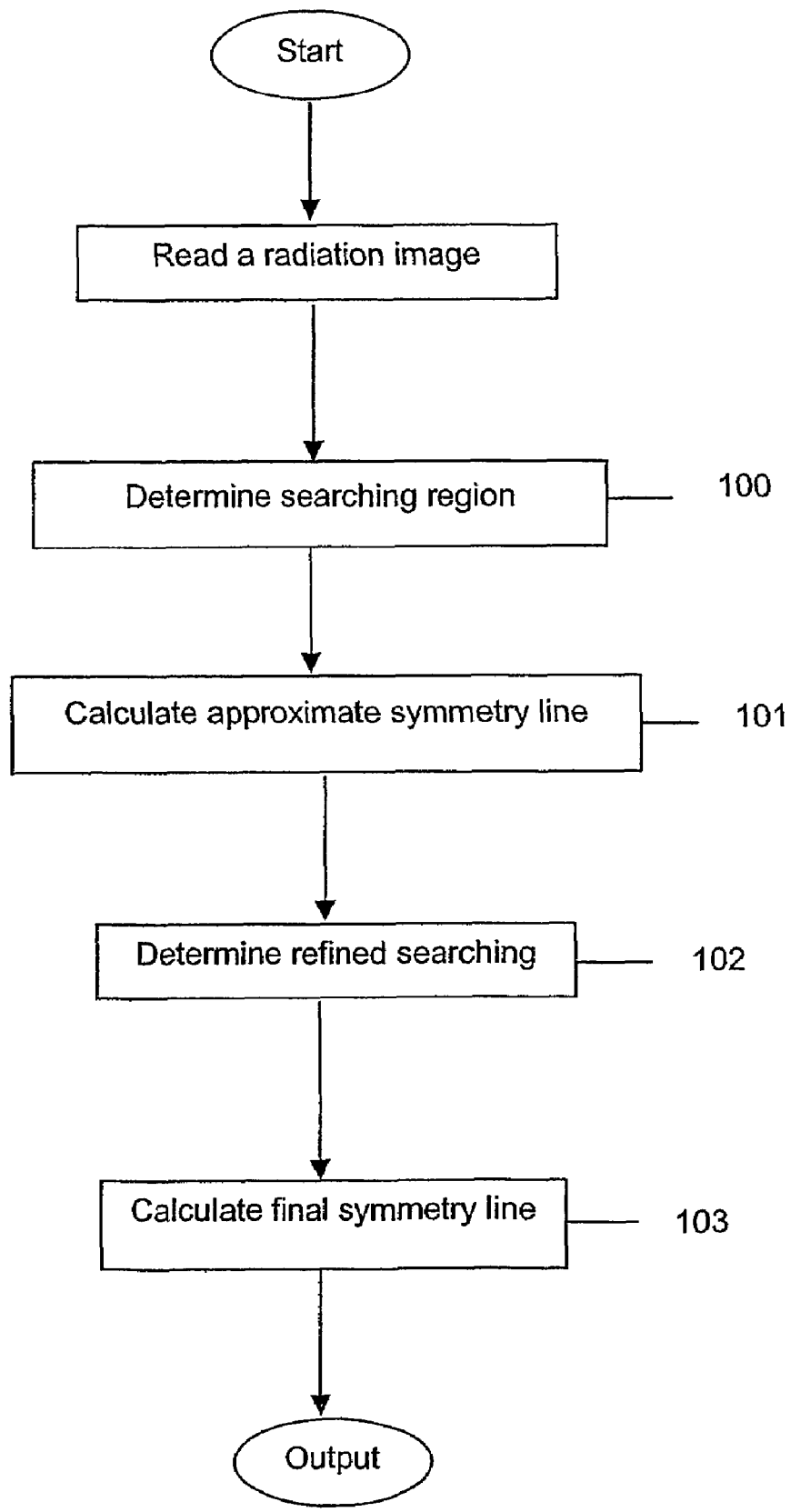
FIG. 12 is a flow chart illustrating steps for determining symmetry line from radiation images.

Referring to FIG. 12, the extraction of symmetry line from a radiation image according to an embodiment is illustrated.

After reading in the radiation image, its gross searching region is determined (100). For approximately vertical symmetry, the gross searching region (x,y,θ) is defined by −15 mm≦$(x-x_c)$≦15 mm
−2 mm≦$(y-y_c)$≦2 mm
−20°≦θ≦20° where $x_c$=XSize/2, and $y_c$=YSize/2.

For approximately horizontal symmetry, the gross searching region (x,y,θ) is defined by:

−2 mm≦$(x-x_c)$≦2 mm
−15 mm≦$(y-y_c)$≦15 mm
70°≦θ≦110°

The next step is to calculate the rough position of the symmetry line (101). This is achieved by minimizing the modified local symmetry index at searching points in the gross searching region. Search is done in the gross searching region preferably with x increment 2 mm, y increment 2 mm, and angle increment 2°. The searching line segment ls(x,y,θ) that minimizes the modified local symmetry index is taken as the approximated symmetry line segment and is denoted as ls($x_0,y_0,\theta_0$).

The next step is to determine the refined searching region (102). The refined region (x,y,θ) is around ($x_0,y_0,\theta_0$) such that:

−3.0 mm≦$(x-x_0)$≦3.0 mm
−3.0 mm≦$(y-y_0)$≦3.0 mm
−3.0°≦$(\theta-\theta_0)$≦3.0°

The final step is to determine the final symmetry line (103). This is done via calculating the modified local symmetry index in the refined region and taking the line segment that minimizes the modified local symmetry index as the final symmetry line segment. The search in the refined searching region is preferably carried out with x increment 0.5 mm, y increment 0.5 mm, and θ increment 0.5°.

Figure 13:
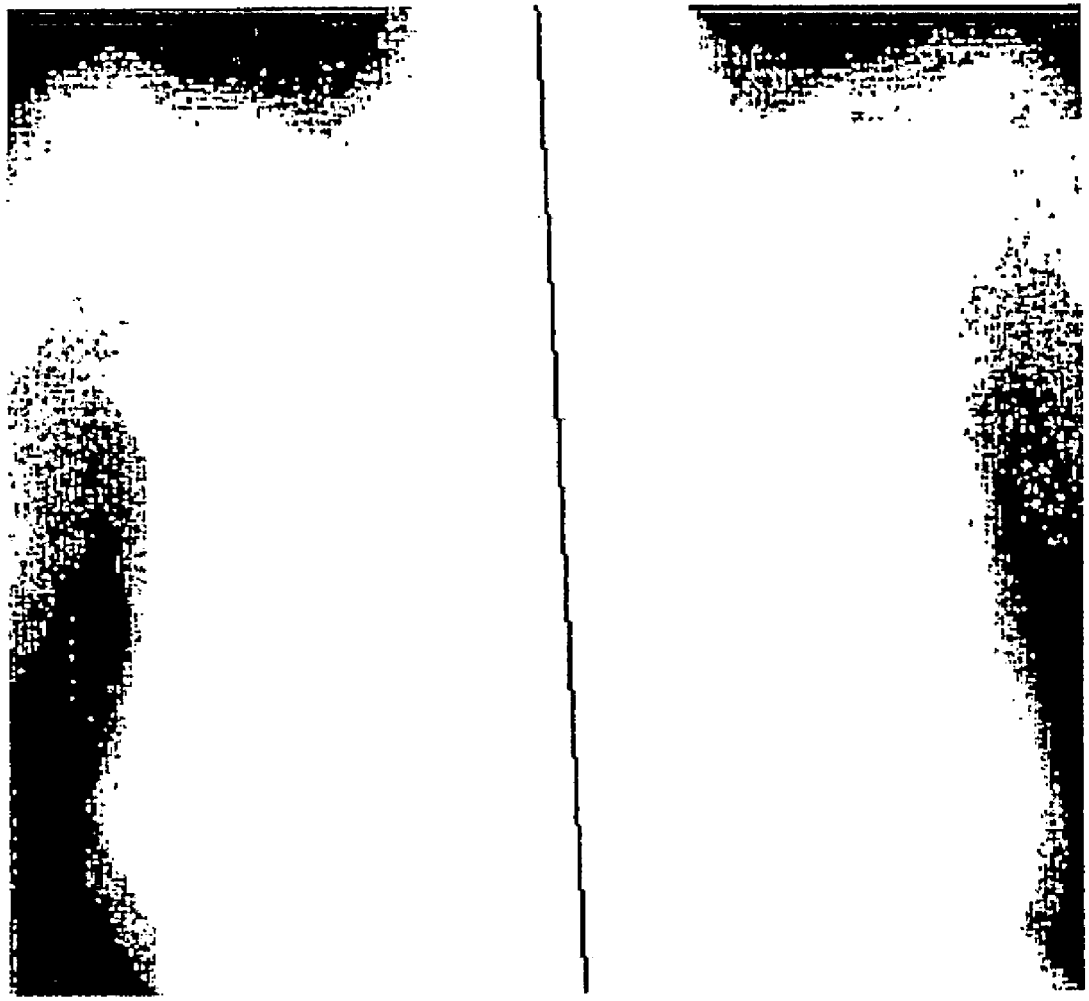
FIG. 13 shows a radiation image, superimposed with the detected symmetry line.

A working illustration of this embodiment of the invention is provided in FIG. 13. It shows a thorax image with automatically computed symmetry axis superimposed. The time taken for the extraction is 50 seconds on a SGI O2 system with mips 10000, 195 MHz CPU, and 190 MB RAM.

This invention discloses a method for extracting MSP of human brain from radiological images. To gain speed, part of the axial slices in the volume are automatically picked out for fissure line segment extraction. Local symmetry index and fissure pattern measure are introduced to describe the grey level and geometrical features of fissure line segments in axial slices. The approximation of each fissure line segment is mathematically defined as locating the line segment that optimises the weighted sum of fissure pattern measure and local symmetry index. In order to tailor for clinical data and possible pathology, two rounds of outlier removal are applied. The first round is to remove those approximated fissure line segments that have quite a large angle deviation (1.0°) from the most probable angle of all the approximated fissure line segments. For the remaining approximated fissure line segments, a plane equation is approximated. The second round is to remove those end points of the remaining approximated fissure line segments that have quite a large distance deviation (1.0 mm) from the most probable distance to the approximated plane. Both the most probable angle and most probable distance are determined by finding the peak of the corresponding histograms. After two rounds of removal, the remaining end points of the approximated fissure line segments are combined to calculate the plane equation of MSP. The disclosed method can extract MSP for clinical routine 3D MR images within 30 seconds under a common hardware setup regardless of the matrix dimension of the images (as large as 256×256×256), pulse sequences (T1-weighted, T2-weighted, flair, or proton density weighted), scanning orientations (axial, coronal or sagittal), and normal or pathological subjects.

The preferred embodiment includes 3 major steps: (1) determining axial slices to be further processed for fissure line segments, (2) approximating fissure line segments in axial slices by optimisation of local symmetry index and fissure pattern measure, and (3) calculating the plane equation of MSP from the approximated fissure line segments via histogram analysis.

With slight modification, the method is applied to extracting symmetry line in a radiation image.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims.

The invention claimed is:

1. A method of determining symmetry in an image, the method including:
    a) determining at least one searching line segment within a predefined search area of an image portion, the at least one searching line segment including a reference point (x, y) at its center and an angle θ with respect to a predetermined axis of the image portion;
    b) for each searching line segment, determining a first local characteristic in accordance with a measurement at points adjacent the searching line segment; and
    c) determining the symmetry in the image in accordance with a calculation based on the first local characteristic.

2. A method as claimed in claim 1, wherein the first local characteristic is a local symmetry index lsi(x,y,θ) determined according to:
    d) for at least one pixel on said searching line segment, determining the sum of grey level differences for N pixel pairs located each side of said at least one pixel, said pixel pairs located on a line perpendicular to said searching line segment and intersecting said at least one pixel; and
    e) summing said grey level differences determined in step d) and dividing this sum by the length of said searching line segment.

3. A method as claimed in claim 2, wherein N=5 and the pixel pairs are located at 2, 4, 6, 8 and 10 mm, respectively, from said at least one pixel.

4. A method as claimed in claim 1, wherein the first local characteristic is a modified local symmetry index mlsi(x,y,θ) determined according to:
    f) for at least one pixel on said searching line segment, locating a closest pixel having a grey level less than a value below which a pixel is unlikely to be an object pixel and located on a line perpendicular to said searching line segment and passing through said pixel, and measuring a reference distance between said closest pixel and said line segment;
    g) for at least one pixel on said searching line segment, determining the sum of grey level differences for N pixel pairs located each side of said pixel, said pixel pairs located on said line perpendicular to said line segment and intersecting said at least one pixel; and
    h) summing said grey level differences determined in step g) and dividing this sum by the length of said searching line segment.

5. A method as claimed in claim 3, wherein N=5 and the pixel pairs are located at 2, 4, 6, 8 and 10 mm plus said reference distance, respectively, from said at least one pixel.

6. A method of determining a symmetry plane line segment of a 3D image, the 3D image comprising a set of parallel 2D slices, the method including:
    a) determining a first subset of slices from the plurality of 2D slices in accordance with predetermined criteria;
    b) for each of the first subset of slices, determining at least one searching line segment within a predefined search area of the slice, the at least one searching line segment including a reference point (x, y) at its center and an angle θ with respect to a predetermined axis of the slice;
    c) for each searching line segment, determining a first local characteristic in accordance with a measurement at points adjacent the searching line segment;
    d) for each searching line segment, determining a second local characteristic in accordance with a measurement at points along the searching line segment; and
    e) determining the symmetry plane line segment in accordance with a calculation based on the first and second local characteristics.

7. A method as claimed in claim 6, wherein the first local characteristic is a local symmetry index lsi(x,y,θ) determined according to:
    f) for at least one pixel on said searching line segment, determining the sum of grey level differences for N pixel pairs located each side of said at least one pixel, said pixel pairs located on a line perpendicular to said searching line segment and intersecting said at least one pixel; and
    g) summing said grey level differences determined in step f) and dividing this sum by the length of said searching line segment.

8. A method as claimed in claim 7, wherein N=5 and the pixel pairs are located at 2, 4, 6, 8 and 10 mm, respectively, from said at least one pixel.

9. A method as claimed in claim 6, wherein the second local characteristic is a fissure pattern measure fpm(x,y,θ) determined according to:

$$fpm(x,y,\theta)=0.5(255-agl(x,y,\theta))-sd(x,y,\theta)*0.8 \; YSize/(3 \; npb(x,y,\theta)) \text{ for Ti-weighted slices, and}$$

$$fpm(x,y,\theta)=0.5agl(x,y,\theta)-sd(x,y,\theta)*0.8 \; YSize/(3 \; npa(x,y,\theta)) \text{ for T2-weighted slices,}$$

where agl(x,y,θ) is the average grey level along said searching line segment ls(x,y,θ), sd(x,y,θ) the standard deviation of grey level along ls(x,y,θ), npa(x,y,θ) the number of pixels on ls(x,y,θ) whose grey level is above agl(x,y,θ), and npb(x,y,θ) the number of pixels on ls(x,y,θ) whose grey level is below agl(x,y).

10. A method as claimed in claim 6, wherein the calculation of step e) includes a weighted sum ws(x,y,θ) of the first and second local characteristics.

11. A method as claimed in claim 10, wherein said weighted sum ws(x,y,θ) of said local symmetry index lsi(x,y,θ) and said fissure pattern measure fpm(x,y,θ) along said searching line segment lsi(x,y) is defined by:

$$ws(x,y,\theta)=a_1*fpm(x,y,\theta)-a_2*lsi(x,y,\theta)$$

where $a_1$ and $a_2$ are positive floating constants that are determined by discriminant analysis.

12. A method as claimed in claim 6, wherein the method is performed in two steps of different resolutions including:
   searching in a first predefined gross search area of a slice defined by:

$$-10 \text{ mm } (x-x_c(S_{snum})) \leq 10 \text{ mm}$$

$$y = y_c(S_{snum})$$

$$-10° \leq \theta \leq 10°$$

with a gross searching increment, given by an x increment of 2 mm, and an angle increment of 2°, to estimate the position of said symmetry plane line segment, where $x_c(S_{snum})$ and $y_c(S_{snum})$ represent the center of said slice; and
   searching in a second predefined fine search area of a slice defined by:

$$-3.0 \text{ mm} \leq (x-x_c) \leq 3.0 \text{ mm}$$

$$y = y_0$$

$$3.0°(\theta-\theta_0) \leq 3.0°$$

with a fine searching increment, given by an x increment of 0.5 mm, and an angle increment of 0.5°, where $(x_0, y_0, \theta_0)$ represents the searching line segment that maximizes said weighted sum of said local symmetry index $lsi(x,y,\theta)$ and said fissure pattern measure $fpm(x,y,\theta)$ in said gross search area with said gross searching increment.

13. A method as claimed in claim 6, wherein said first subset of slices from the set of 2D slices are determined in accordance with the following predetermined criteria:
   (h) calculate average grey levels for each slice;
   (i) calculate a histogram of said average grey levels;
   (j) determine a grey level threshold;
   (k) determine a first slice with a grey level equal to or greater than said threshold;
   (l) determine a last slice with a grey level equal to or greater than said threshold; and
   (m) determine a slice increment step size between said first slice and said last slice.

14. A method as claimed in claim 6, wherein the symmetry plane line segment is a fissure line segment of a medical image.

15. A method as claimed in claim 14, wherein the medical image is a volumetric image produced by any one or more of the following techniques:
   i) CT;
   ii) MRI;
   iii) PET;
   iv) SPET.

16. A method of determining a symmetry line of a 2D image, the method including:
   a) determining at least one searching line segment within a predefined search area of a 2D image portion, the at least one searching line segment including a reference point (x, y) at its center and an angle θ with respect to a predetermined axis of the 2D image portion;
   b) for each searching line segment, determining a first local characteristic in accordance with a measurement at points adjacent the searching line segment; and
   c) determining the symmetry line in accordance with a calculation based on the first local characteristic.

17. A method as claimed in claim 16, wherein the first focal characteristic is a modified local symmetry index $mlsi(x,y,\theta)$ determined according to:

(d) for at least one pixel on said searching line segment, locating a closest pixel having a grey level less than a value below which a pixel is unlikely to be an object pixel and located on a line perpendicular to said searching line segment and passing through said pixel, and measuring a reference distance between said closest pixel and said line segment;
   (e) for at least one pixel on said searching line segment, determining the sum of grey level differences for pixel pairs located each side of said pixel, said pixel pairs located on said line perpendicular to said line segment and intersecting said at least one pixel; and
   (f) summing said grey level differences determined in step e) and dividing this sum by the length of said searching line segment.

18. A method as claimed in claim 16, wherein the symmetry line is a symmetry line of a medical image.

19. A method as claimed in claim 18, wherein the medical image is a 2D radiation image.

20. A computer program product including:
   a computer usable medium having computer readable program code and computer readable system code embodied on said medium for determining symmetry in an image, said computer program product further including:
   computer readable code within said computer usable medium for:
      a) determining at least one searching line segment within a predefined search area of an image portion, the at least one searching line segment including a reference point (x, y) at its center and an angle θ with respect to a predetermined axis of the image portion;
      b) for each searching line segment, determining a first local characteristic in accordance with a measurement at points adjacent the searching line segment; and
      c) determining the symmetry in the image in accordance with a calculation based on the first local characteristic.

21. A computer program product including:
   a computer usable medium having computer readable program code and computer readable system code embodied on said medium for determining a symmetry plane line segment of a 3D image, the 3D image comprising a set of parallel 2D slices, said computer program product further including:
   computer readable code within said computer usable medium for:
      a) determining a first subset of slices from the plurality of 2D slices in accordance with predetermined criteria;
      b) for each of the first subset of slices, determining at least one searching line segment within a predefined search area of the slice, the at least one searching line segment including a reference point (x, y) at its center and an angle θ with respect to a predetermined axis of the slice;
      c) for each searching line segment, determining a first local characteristic in accordance with a measurement at points adjacent the searching line segment;
      d) for each searching line segment, determining a second local characteristic in accordance with a measurement at points along the searching line segment; and
      e) determining the symmetry plane line segment in accordance with a calculation based on the first and second local characteristics.

22. A computer program product including:
a computer usable medium having computer readable program code and computer readable system code embodied on said medium for determining a symmetry line segment of a 2D image, said computer program product further including:
computer readable code within said computer usable medium for:
  a) determining at least one searching line segment within a predefined search area of the 2D image, the at least one searching line segment including a reference point (x, y) at its center and an angle θ with respect to a predetermined axis of the slice;
  b) for each searching line segment, determining a first local characteristic in accordance with a measurement at points adjacent the searching line segment; and
  c) determining the line segment in accordance with a calculation based on the first local characteristic.

* * * * *